United States Patent [19]
Strzelewicz

[11] 3,811,089
[45] May 14, 1974

[54] REMOTE ENGINE TACHOMETER
[75] Inventor: Anthony S. Strzelewicz, Roseville, Mich.
[73] Assignee: General Motors Corporation, Detroit, Mich.
[22] Filed: July 14, 1972
[21] Appl. No.: 271,996

[52] U.S. Cl. .................................. 324/170, 324/16
[51] Int. Cl. .............................................. G01p 3/48
[58] Field of Search ........... 324/169, 170, 173, 78 I, 324/78 E, 15-18

[56] References Cited
UNITED STATES PATENTS
3,590,811  7/1971  Harris ........................... 324/78 UX
3,601,773  8/1971  Frieling ............................ 324/170
3,656,059  4/1972  Overstreet ......................... 324/173

OTHER PUBLICATIONS
R. M. Benrey–Build Your Own "Wireless" Tach–Popular Science – March, 1965– pp. 110–112.

*Primary Examiner*—Michael J. Lynch
*Attorney, Agent, or Firm*—Paul Fitzpatrick

[57] ABSTRACT

A tachometer which does not require connection with the engine. A probe placed near the engine picks up electromagnetic radiation produced by the distributor points and coil in bursts timed with engine speed. A bandpass filter suppresses all frequencies except a narrow band which is amplified in a circuit with automatic gain control using optic elements in the feedback loop. A reference voltage whose level is a constant fraction less than the signal maximum is produced and compared with the signal in a comparator, the output of which triggers a one shot pulse generator to produce a train of pulses of constant width and amplitude at a frequency proportional to engine speed.

3 Claims, 7 Drawing Figures

BENEATH CAR APPLICATION

ALONGSIDE CAR APPLICATION

CAR TOP APPLICATION

REMOTE ENGINE TACHOMETER

SUMMARY OF THE INVENTION

Situations exist in which it is desirable to measure the speed of an internal combustion engine but it is impossible or inconvenient to make circuit connections to the engine. One example of such a situation is an automotive assembly line, where it is necessary to make certain tests involving engine speed. The speed of the assembly line, limited access to desired connection points and the variety of engine configurations and accessories present on the same assembly line make tachometer connections impractical.

Some have taken advantage of the bursts of electromagnetic radiation given off by the distributor points and coil of an engine ignition system to design wireless tachometers which do not have to be connected to the engine. Such devices generally detect radio frequency radiations and use them to trigger a one shot pulse generator which produces a train of pulses of constant width and a frequency proportional to engine speed. Such a train of pulses can be counted to produce a digital indication of engine speed; or the voltage of the pulse train can be averaged to produce an analog of engine speed. The results can be displayed to an observer in a variety of ways well known in the art.

However, an automobile with engine and accessories running can produce a variety of electromagnetic radiation, much of which interferes with the operation of any such tachometer. In addition, advances have been made in the suppression of radio frequency ignition radiation which might interfere with radio reception in the vehicle or in the area in which the vehicle is operating. Thus, the signals to which the present devices respond have been practically lost in electromagnetic noise. The result is that the placement of such tachometers or their sensing probes is extremely critical and varies from vehicle to vehicle. On some vehicles, the tachometers do not work at all.

My invention is a tachometer which also senses bursts of electromagnetic radiation from the engine ignition system. However, my tachometer is able to respond to some of the signals carrying engine speed information in spite of the background noise and automatically compensates for variations in signal strength. Its sensing probe can be permanently mounted so that the automobile will pass over it or by it, or it can be placed on top of a closed engine compartment. It produces an accurate reading in just a few seconds and maintains this reading consistently as long as it remains within its rather large effective area. It is effective for a large variety of vehicle engine and body configurations and designs, and is thus ideally suited for assembly line use; although, of course, it is also applicable in a great variety of other situations.

My invention operates by singling a narrow band of frequencies out of the electromagnetic radiation around an engine, which band of frequencies includes a particular selected frequency known to be given off in bursts in time with the breaking of the distributor point contacts. This signal is then amplified in the amplifier with variable gain. The output of this amplifier is fed to a peak memory circuit which produces a DC voltage which follows the peaks of the signal bursts in the amplifier output. This DC voltage is fed back to the amplifier in an automatic gain control circuit to stabilize the amplifier output level. To counter the effect of noise in the amplified signal, the output of the peak memory circuit is attenuated and compared with the output of the amplifier in a comparator. The output of the comparator triggers a pulse generator to produce a train of pulses of constant width whose frequency is proportional to engine speed. This pulse train can then be used to produce an indication of engine speed.

The details as well as other objects and advantages of this invention are set forth in the drawings and description of the preferred embodiment.

DESCRIPTION OF THE PREFERRED EMBODIMENT

Figure 1:
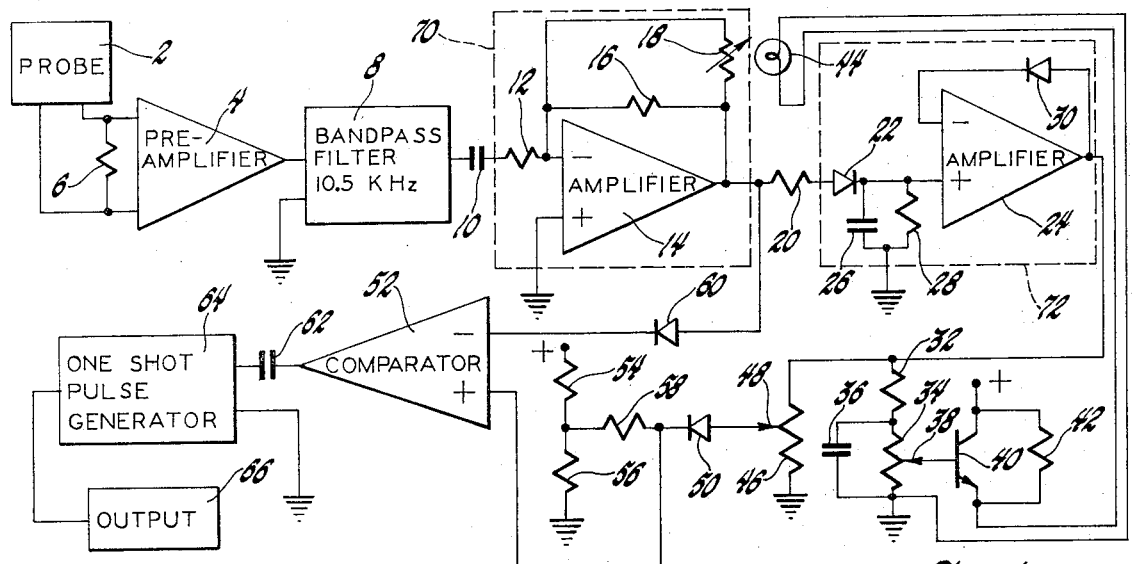
FIG. 1 shows a preferred embodiment of the invention.

Referring to FIG. 1, an electromagnetic signal sensing means consisting of a probe 2 is connected across the input of a preamplifier 4. The probe consists of a standard inductive pickup encased in a urethane block for protection from shock and assistance in placement. The probe can be mounted or held remotely from the rest of the circuit and connected to the preamplifier by a reasonably long wire. A plug, not shown, can be inserted between the probe 2 and preamplifier 4 so that the probe could be disengaged from the rest of the circuit. A loading resistor 6 is also connected across the input of the preamplifier 4 to prevent the circuit from responding to electromagnetic noise should the probe be disconnected from the circuit. It should be noted here that the preamplifier 4 will not be needed in all cases; it is possible to choose components providing sufficient total amplification to make the preamplifier 4 unnecessary.

The output from the preamplifier 4 is connected across the input of a frequency discriminating means, in this embodiment, a 10.5 KHz bandpass filter 8. The output of the bandpass filter 8 is connected through a capacitor 10 and resistor 12 to the inverting input of an operational amplifier 14. The non-inverting input of operational amplifier 14 is grounded; and the feedback loop consisting of resistor 16 and variable resistor 18 in parallel connects the output with the inverting input. Variable resistor 18 is a light sensitive resistor whose resistance varies inversely with light intensity.

The output of amplifier 14 is connected through resistor 20 and forward biased diode 22 to the non-inverting input of operational amplifier 24. A capacitor 26 and resistor 28 in parallel connect the non-inverting input of amplifier 24 to ground. The output of amplifier 24 is fed back through the forward biased diode 30 to the inverting input of amplifier 24. The output of amplifier 24 is connected through resistor 32 and potentiometer 34 in parallel with capacitor 36 to ground. Potentiometer 34 has a variable resistance tap 38 which is connected to the base of a transistor 40. The collector of transistor 40 is connected to a power source at a positive potential, not shown; and a resistor 42 is connected across the collector and emitter of the transistor 40. The emitter of transistor 40 is connected through the lamp 44 to ground. The lamp 44 is physically placed so that its light intensity will affect the light sensitive resistor 18; in practice, a unit is used which integrates the lamp 44 and light sensitive resistor and shields both from outside light.

The output of amplifier 24 is also connected through potentiometer 46 to ground. Potentiometer 46 has a variable resistance tap 48 which is connected through the forward biased diode 50 to the non-inverting input of the comparator 52. Resistors 54 and 56 in series comprise a voltage divider between a source of power at a positive potential, not shown, and ground. Resistor 58 connects the junction of resistors 54 and 56 with the non-inverting input of comparator 52. The forward biased diode 60 connects the output of amplifier 14 with the inverting input of comparator 52.

The output of comparator 52 is connected through a capacitor 62 to the triggering input of a one shot pulse generator 64. The output of the one shot pulse generator 64 is connected to the output means 66, which will be described later in the specification.

The operation of the system will now be described. When the probe 2 is placed in one of the sensitive areas near the vehicle engine compartment, the various electromagnetic signals generate varying voltages within the probe 2 which are conducted to the input of the preamplifier 4. A graphical representation of voltage versus time might typically look like waveform A in FIG. 2. This waveform exhibits some slight increase in amplitude at regular intervals corresponding to the making and breaking of the distributor point contact, but these maxima are insufficiently distinct above the background noise to reliably trigger the one shot pulse generator. The amplified signal from the output of the preamplifier 4 is represented by waveform B in FIG. 2. The maxima here are more apparent to the eye; but the background noise has been amplified to the same degree as the maxima.

Figure 2:
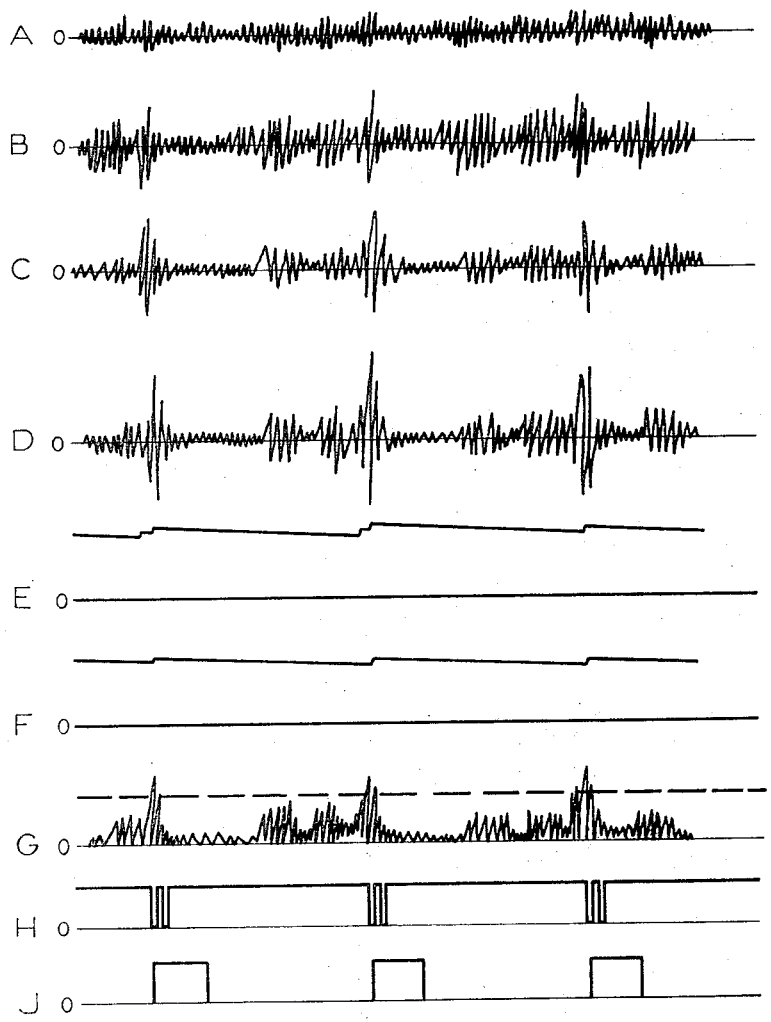
FIG. 2 shows waveforms of voltage varying with time at a number of points in the circuit shown in FIG. 1.
Figure 3A:
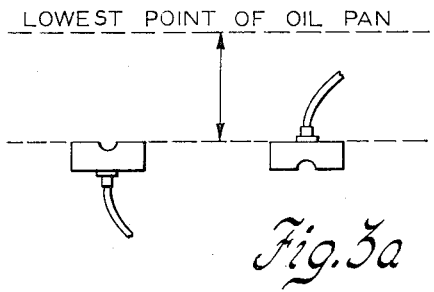
FIGS. 3a – 3e show typical placement of the sensing probe of the invention and a typical effective range of the sensing probe in relation to a vehicle engine compartment.
Figure 3B:
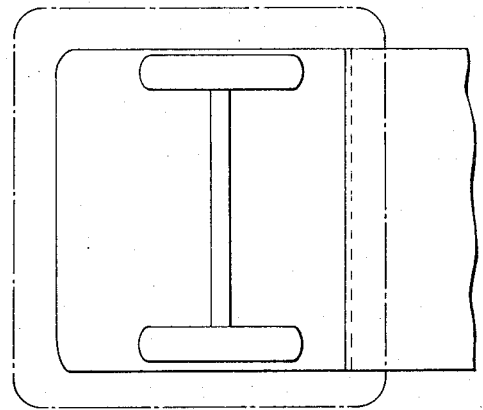
Figure 3C:
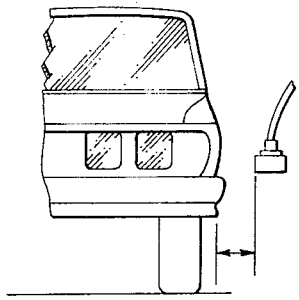
Figure 3D:
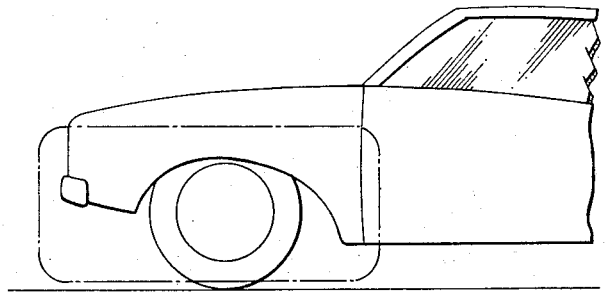
Figure 3E:
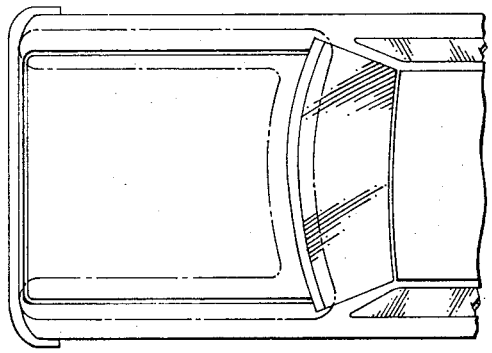

The output signal from the bandpass filter 8 is represented by waveform C of FIG. 2. This signal is composed almost entirely of a narrow band of frequencies around 10.5 KHz in the audio range. This frequency is chosen because it is found that most vehicle internal combustion engines generate electromagnetic signals in this range, although other frequencies, including radio frequencies, could be chosen. It can be seen that the periodic maxima are now significantly greater than the background noise, since most of the electromagnetic waves in this narrow band of frequencies are produced only when distributor point contact is broken.

It is desirable, however, to reduce the background noise level to an even greater extent compared with the periodic maxima so that completely reliable operation of the system may be obtained. The amplifier 14, resistor 12, resistor 16, and light sensitive variable resistor 18 comprise an amplifying means 70 of variable gain, which gain is controlled by the light sensitive resistor 18.

Waveform D of FIG. 2 represents the output of amplifier 14. The capacitor 10 prevents any DC bias in the output signal of the bandpass filter 8 from also being amplified in amplifier 14. Naturally, as the probe 2 is moved relative to the vehicle engine, the strength of the signal can be expected to vary greatly; and therefor the amplitude of waveform D would also vary greatly. It is desirable to reduce this variation so that a signal of substantially constant maximum amplitude is available for the remainder of the circuit. Circuit elements 18 through 44 comprise an automatic gain control circuit for amplifier 14 in which a DC voltage proportional to the average peak signal amplitude at the output of amplifier 14 is generated, and a lamp is driven in accordance with this voltage to vary the resistance of the light sensitive resistor 18 in the negative feedback loop of amplifier 14 so that the gain of amplifier 14 is automatically varied to produce a substantially constant maximum output amplitude.

This is done in the following described portion of the circuit. The diode 22, capacitor 26, resistor 28, amplifier 24 and diode 30 together comprise a peak memory circuit 72, the output of which is the waveform E of FIG. 2. The diode 22 cuts off the negative portion of waveform D. The values of the capacitor 26, which is charged by signal peaks, and resistor 28, which bleeds off the charge slowly, determine how quickly the voltage decreases after each maximum in waveform D. The voltage must fall slowly enough to follow only the peaks of the periodic bursts and approximate a DC voltage but must fall fast enough so that this approximate DC voltage will be able to decrease should the amplitude of those peaks in waveform D decrease. Such a critical balance can be upset by an abnormally large pulse in waveform D such as might be caused by any of a variety of engine malfunctions. Therefore, a resistor 20 is included to attenuate any such abnormally high peaks.

The output of this peak memory amplifier is fed to a voltage divider consisting of resistor 32 and potentiometer 34. Capacitor 36 in parallel with potentiometer 34 filters the voltage to provide a better approximation to a DC voltage. A particular fraction of this voltage is selected by tap 38 on potentiometer 34 and is used to control a driving transistor 40 for the lamp 44. Thus the intensity of the lamp 44 varies proportionately with the maximum signal amplitude in waveform D. The lamp intensity controls the resistance of the light sensitive resistor 18 to decrease the gain of amplifier 14 when the maximum output signal amplitude increases and to increase the gain of amplifier 14 when the maximum output signal amplitude decreases so that large signal amplitude variations in the output of amplifier 14 are prevented.

The background noise in the waveform D is eliminated in comparator 52 wherein a DC voltage a constant fraction less than the maximum signal amplitude of waveform D is subtracted from the positive portion of waveform D. This is demonstrated in waveform G of FIG. 2 wherein only the portion of the waveform which appears above the dotted line, which represents the DC reference voltage, is amplified. The DC reference voltage is obtained from the peak memory circuit. The output of amplifier 24 is attenuated to the desired degree by tap 48 on potentiometer 46 and fed to the comparator through diode 50. The voltage divider consisting of resistors 54 and 56 ensures that some positive DC reference voltage will be present at all times to prevent false triggering by noise when signals from an engine are not being received by the probe 2.

It is not necessary that the DC reference voltage be absolutely smooth. A substantial ripple can exist on this voltage without degrading the performance of the circuit. In this embodiment, for example, the DC reference voltage is shaped like waveform E of FIG. 2. The limitations on this ripple are that the DC reference voltage must always remain greater than the amplitude of the noise between the periodic bursts in the amplified signal but must not be so great as to render the peaks of the periodic bursts undetectable in comparison. If it is desired to smooth the DC reference voltage, a capacitor could be added from the junction of resistor 58 and diode 50 to ground.

The comparator 52 is a two-state device whose output state is determined by the larger of the inputs. The output of comparator 52 is shown in waveform H of FIG. 2. It consists of a constant positive DC bias interrupted by periodic groups of negative-going spikes. Capacitor 62 does not pass the DC bias but passes the negative-going DC spikes to trigger the one-shot pulse generator 64. The output of the one-shot pulse generator 64 is shown as waveform J of FIG. 2. A negative-going spike in the input triggers a pulse of constant pulse width. The pulse width is adjusted so that is greater than the total width of the group of negative-going spikes; and therefore the pulse will be triggered only by the first negative-going spike of each group. The frequency with which these pulses appear is proportional to engine speed.

The output means 66 can be any one of the numerous well known means for producing an indication of engine speed from a train of pulses of constant width and amplitude at a frequency proportional to engine speed. One such means, for example, is an averaging current meter with a scale calibrated in engine speed units. Many other means applicable to different situations and different types of desired indications will occur to those skilled in the art.

FIG. 3 illustrates the typical placement of the probe for consistent system operation. The probe may be held under the engine compartment of the vehicle or placed on the ground as in FIG. 3a for the vehicle to be driven or pulled over it. FIG. 3b shows a typical area of sensitivity underneath the engine; the system will operate correctly if the probe is located anywhere within the area bounded by the broken line. The probe may also be stationed beside the vehicle as shown in FIG. 3c. FIG. 3d shows the area of sensitivity of the probe in such a position as the area bounded by the broken lines. In FIG. 3e the U-shaped area enclosed by the broken line indicates the area of sensitivity for a probe placed on top of an engine compartment with an openable hood. The indicated sensitive areas are typical; some vehicles will have larger areas of sensitivity. In addition, the orientation of the probe can vary from that shown for many vehicles. It can be seen that a probe can be thrown underneath, held near or placed on top of the engine compartment of a stationary vehicle or can be permanently positioned to test a vehicle being slowly driven or pulled past it. Because of its noise suppression and automatic gain control, the system will give a consistent, reliable reading as long as the probe is within the sensitive area.

The system has been built and shown to operate successfully in the manner described with the following components: resistor 6, 100K; preamplifier 4, Burr-Brown 3263/14; bandpass filter 8, Burr-Brown 5718-BPIP-1052; capacitor 10, 0.1 mfd; resistor 12, 22K; amplifier 14, Fairchild U6A7741393; resistor 16, 1 meg; resistor 18 and lamp 44, Raysistor, Raytheon CK1116; resistor 20, 2.2K; diode 22, IN3605; capacitor 26, .05 mfd; resistor 28, 50 meg; amplifier 24, Fairchild U6A7741393; diode 30, IN3605; resistor 32, 10K; resistor 34, Dale potentiometer series 2100, 10K; capacitor 36, 150 mfd; transistor 40, 2N1711; resistor 43, 4.7K; resistor 46, Dale potentiometer series 2100, 10K; diode 50, IN464; comparator 52, Analog Devices AD351J; resistor 54, 210K; resistor 56, 47K; resistor 58, 47K; diode 60, IN91; capacitor 62, .01 mfd; one-shot pulse generator 64, Texas instruments SN74121N. A DC power supply with taps at positive and negative 15 volts and ground was used for the active element; a tap at positive 5 volts was connected to resistor 54.

It should be noted that the preferred embodiment herein described is not the only embodiment of my invention that will occur to those skilled in the art and the invention should not be limited to the elements described.

I claim:

1. A tachometer for an engine, said engine having an electric ignition system radiating bursts of electromagnetic signals at a rate proportional to the rate of engine rotation, the tachometer comprising, in combination:
   means effective to receive electromagnetic signals radiated by the engine;
   a bandpass filter connected to the output of the electromagnetic signal receiving means, the bandpass filter passing only signals having frequencies within a narrow band in the audio range;
   signal amplification means amplifying the output of the bandpass filter, the signal amplification means including an amplifier with a negative feedback loop, the negative feedback loop containing a variable resistor;
   a peak memory circuit responsive to the output of the signal amplification means and operative to generate a DC voltage proportional to the peak amplitude of the output of the signal amplification means;
   filter means connected to the output of the peak memory circuit to smooth the DC voltage output thereof;
   means responsive to the output of the filter means to vary the resistance of the variable resistor so as to stabilize the output of the signal amplification means;
   voltage attenuating means responsive to the output of the peak memory circuit and operative to attenuate this output by a fixed fraction;
   a comparator operative to compare the output of the signal amplification means with the output of the voltage attenuating means and generate an output signal when the former exceeds the latter; and
   means to generate a pulse of constant duration each time the comparator produces an output signal.

2. A tachometer for indicating the rotational speed of an engine having an electrical ignition system radiating bursts of electromagnetic signals at a rate proportional to the rate of engine rotation, the tachometer comprising, in combination:
   an electromagnetic signal sensing probe;
   a bandpass filter connected to said probe, the bandpass filter being tuned to a frequency in the audio range;
   a first capacitor having one end connected to the output of the bandpass filter;
   a first operational amplifier having an output, a grounded non-inverting input and an inverting input connected through an input resistor to the other end of the first capacitor;

first and second resistors in parallel connecting the output and inverting input of the first operational amplifier, the first resistor having a resistance varying inversely with light intensity;

a third resistor having one end connected to the output of the first operational amplifier;

a first forward biased diode having an input connected to the other end of the third resistor;

a second capacitor and fourth resistor connected between the output of the first forward biased diode and ground;

a second operational amplifier having an output, an inverting input and a non-inverting input connected to the output of the first forward-biased diode;

a second forward-biased diode having an input connected to the output of the second operational amplifier and an output connected to the inverting input of the second operational amplifier;

a fifth resistor having one end connected to the output of the second operational amplifier;

a sixth resistor and third capacitor connected between the other end of the fifth resistor and ground, the sixth resistor having a variable resistance tap;

an NPN transistor having a base connected to the variable resistance tap of the sixth resistor, a collector and an emitter;

a constant voltage source connected to the collector of the NPN transistor;

a seventh resistor connecting the emitter and collector of the NPN transistor;

a lamp physically adjacent the first resistor, the lamp being connected between the emitter of the transistor and ground;

an eighth resistor connected between the output of the second operational amplifier and ground, the eighth resistor having a variable resistance tap;

a comparator having an output, an inverting input and a non-inverting input;

a third forward biased diode having an input connected to the variable tap of the eighth resistor and an output connected to the non-inverting input of the comparator;

ninth and tenth resistors connected in series between the constant voltage source and ground;

an eleventh resistor connecting the junction of the ninth and tenth resistors with the non-inverting input of the comparator;

a fourth forward-biased diode connecting the output of the first operational amplifier with the inverting input of the comparator;

a fourth capacitor having one end connected to the output of the comparator; and a pulse generator having an input connected to the other end of the fourth capacitor and an output at which is produced a train of pulses at a frequency proportional to engine rotation.

3. The tachometer of claim 2 in which the bandpass filter is tuned to a frequency of 10.5 KHz.

* * * * *